United States Patent Office 2,886,556
Patented May 12, 1959

2,886,556

PROCESS OF HYDROXYLATING 2,3,4,5-BIS($\Delta^2$-BUTENYLENE) TETRAHYDROFURFURAL COMPOUNDS, RESULTING PRODUCT, AND A RESIN FORMED THEREFROM John C. Hillyer and Lee O. Edmonds, Bartlesville, Okla., assignors to Phillips Petroleum Company, a corporation of Delaware No Drawing. Application March 7, 1955
Serial No. 492,772

14 Claims. (Cl. 260—67)

This invention relates to the hydroxlation of 2,3,4,5-bis($\Delta^2$-butenylene)tetrahydrofurfural and of alkyl derivatives thereof. In one aspect, this invention relates to a method for preparing hydroxylated aldehydes, acids, esters, lactones and resins by hydroxylating 2,3,4,5-bis($\Delta^2$-butenylene)tetrahydrofurfural and alkyl derivatives thereof. In another aspect, the invention relates to new compositions of matter useful as plasticizers for synthetic rubber and plastics and to novel rubber compositions incorporating these plasticizers.

This application is a continuation-in-part of the copending application, Serial No. 305,286, filed August 19, 1952, now patent No. 2,766,216, and of the copending application Serial No. 315,416, filed October 17, 1952, now abandoned.

According to this invention, new compositions of matter are prepared by hydroxlyating an aldehyde, 2,3,4,5-bis($\Delta^2$-butenylene)tetrahydrofurfural, and alkyl derivatives thereof, with hydrogen peroxide in the presence of formic acid or a selected low alkyl ester of formic acid. The aldehyde is reacted so that either of the two double bonds present in the molecule or both double bonds are hydroxylated, two hydroxy radicals being added to each double bond reacted. The aldehyde, 2,3,4,5-bis($\Delta^2$-butenylene) tetrahydrofurfural and alkyl derivatives thereof, from which the hydroxy compounds of this invention are derived are represented by the formula,

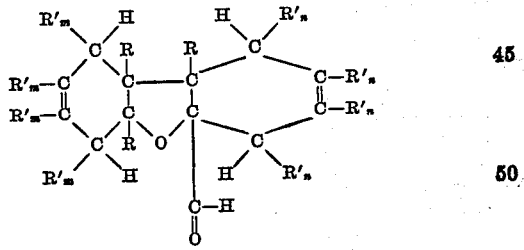

where R is selected from the group consisting of hydrogen and methyl and at least one R is hydrogen; each R' is selected from the group consisting of hydrogen and alkyl radicals having not more than 3 carbon atoms; the sum of the carbon atoms in the R'$_m$ radicals is less than 4; the sum of the carbon atoms in the R'$_n$ radicals is less than 4; and at least two of the R'$_m$ and two of the R'$_n$ radicals are hydrogen. The aldehyde, 2,3,4,5-bis($\Delta^2$-butenylene) tetrahydrofurfural and the alkyl derivatives therof, used as the starting materials, according to this invention, are described and their preparation set forth, by Hillyer and Nicewander, Ind. Eng. Chem. 40, 2216 (1948) and as set forth in U.S. Patent 2,683,151, issued on July 6, 1954.

The term "alkyl," as used herein, means an organic radical having the general formula $C_nH_{(2n+1)}$ ...

The following are formulae of specific starting materials that can be hydroxylated according to this invention:

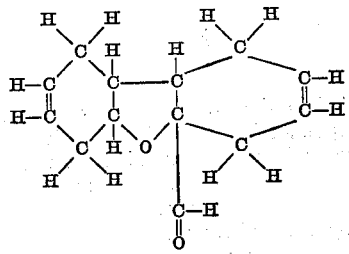

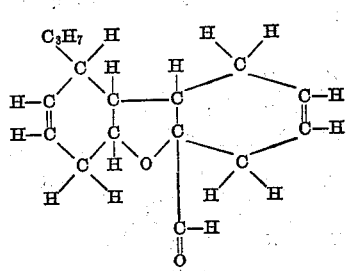

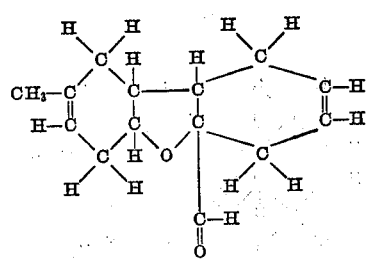

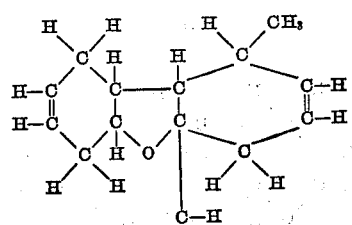

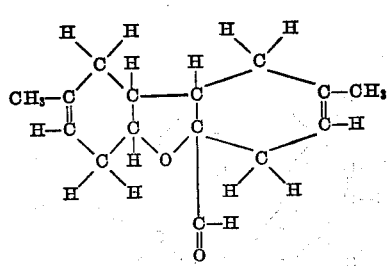

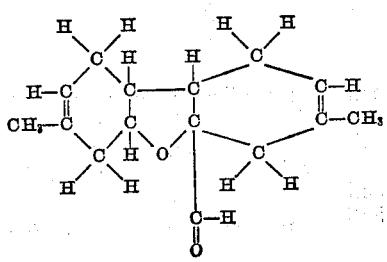

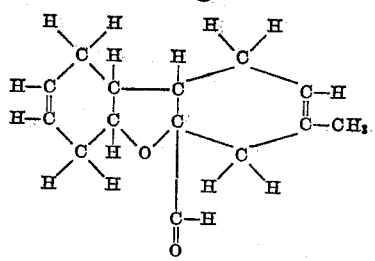

Those skilled in the art will recognize that the non-alkylated compounds illustrated by formula or obtainable by condensing furfural with butadiene, that dimethylated compounds are obtainable from furfural and isoprene, and that monomethylated compounds are obtainable from butadiene, isoprene and furfural.

Additional examples of specific starting materials are the following:

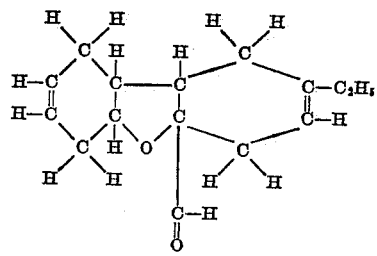

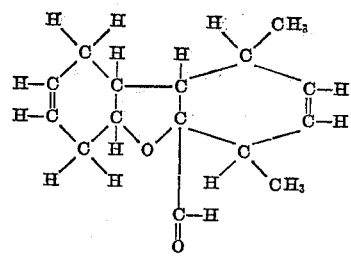

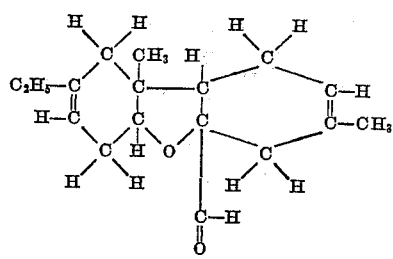

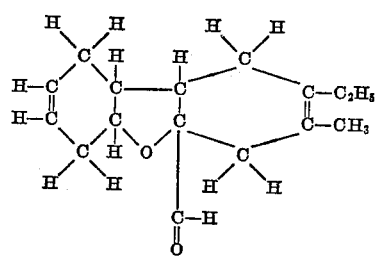

When operating according to the process of this invention, the 2,3,4,5-bis($\Delta^2$-butenylene)tetrahydrofurfural or alkyl derivative thereof is charged to a reactor together with an aqueous solution of hydrogen peroxide and the desired quantity of formic acid. The reactor is provided with an agitating means and a condenser system. The reaction mixture is held at a temperature in the range from about 10 to about 95° C., preferably from 10 to 60° C.

Resinification occurs to a minor degree during the course of the hydroxylation reaction and resinification is enhanced by higher temperatures. Thus, where resins are desired, operation at higher temperatures is advantageous. As will be discussed more fully hereinafter, infusible resins are formed in accordance with this invention, by further heating the product of the hydroxylation reaction to a temperature above the hydroxylation reaction temperature, such as up to about 300° C.

The time of reaction depends on the temperature employed and the degree of hydroxylation desired, that is, whether one or both olefinic bonds are to be hydroxylated. The reaction time is generally in the range from one to 60 hours and preferably in the range from 2 to 30 hours. Hydroxylation is frequently effected at atmospheric pressure and satisfactory results are obtained when operating in this manner. However, when low-boiling catalysts, such as methyl formate, are used, it is desirable to carry out the reaction at a pressure sufficient to maintain the reaction system in liquid phase at the temperature employed.

After the first step in the reaction has been carried out, the mixture is maintained for a time in the range from 15 minutes to 30 hours at a temperature in the range from 10° C. to the refluxing temperature, and is preferably refluxed for a period ranging from 15 minutes to 4 or 5 hours, to decompose any hydrogen peroxide or performic acid (in cases where formic acid has been used as the catalyst) remaining in the system. The water present is removed by heating in vacuo. Methanol is then added to react with any formic acid present, the mixture is heated to around 40 to 50° C., and the methanol and any low-boiling ester removed by heating in vacuo. As will be described more fully hereinafter, the aldehyde radical in the starting material is converted to an acid radical during the hydroxylation reaction, and under favorable reaction conditions a small portion of this acid can react with the added methanol to form a methyl ester. The material which remains as distillation residue is the hydroxylated product, comprising a hydroxylated acid, ester, aldehyde, lactone and resin, as will be described in more detail hereinafter.

In place of hydrogen peroxide, materials capable of yielding hydrogen peroxide can be used, such as peracetic acid, performic acid, urea peroxide, and the like. The hydrogen peroxide is preferably utilized in aqueous solutions of a concentration in the range from 3 to 90 weight percent and preferably in the range from 5 to 40 weight percent. The amount of hydrogen peroxide employed is generally in the range from 0.2 to 4 moles, preferably 0.5 to 3 moles, per mole of the 2,3,4,5-bis($\Delta^2$-butenylene)tetrahydrofurfural or alkyl derivative.

Catalysts suitable for the hydroxylation reaction of this invention preferably include formic acid and lower alkyl esters thereof, for example, methyl formate, ethyl formate, and propyl formate; however, other hydroxylating catalysts can be used and are within the scope of the invention. The catalysts are preferably utilized in equimolar proportions with the hydrogen peroxide; however, mole ratios of catalyst to hydrogen peroxide in the range from 0.2 to 1 to 2:1 can be used.

The hydroxylated products of this invention range in color and consistency from yellow, viscous liquids to dark-brown semisolids.

Hydroxy compounds prepared from the above-described starting materials, according to this invention, have at least one of the double bonds in the formula saturated by the introduction of at least two hydroxyl radicals into the molecule. Either or both of the double bonds are so saturated, depending on reaction conditions set forth hereinabove. A mixture of compounds is produced in the hydroxylation reaction of this invention in which the major component is a hydroxylated acid represented by the formula:

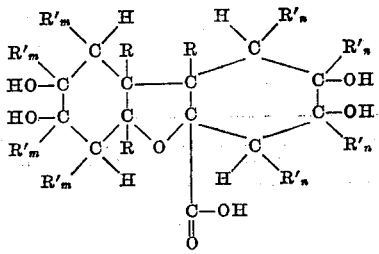

Either one of the double bonds in the starting material can be hydroxylated, forming a dihydroxy compound, or both double bonds can be hydroxylated, forming the tetrahydroxy compound.

The term "hydroxylation," as used in this specification and the claims, denotes a reaction whereby hydroxyl radicals are added to an olefinic double bond, thus

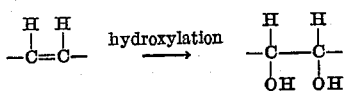

However, other reactions can occur, such as oxidation and esterification, as discussed herein.

In addition to the hydroxylated acid illustrated above, which is the major component of the reaction product, small amounts of a hydroxylated aldehyde are formed, i.e., a hydroxylated product in which the original aldehyde radical is unreacted. Also, minor amounts of a hydroxylated ester are formed which can be represented by the following formula wherein the acid radical of one hydroxylated acid has been esterified by the hydroxyl radical of another hydroxylated acid:

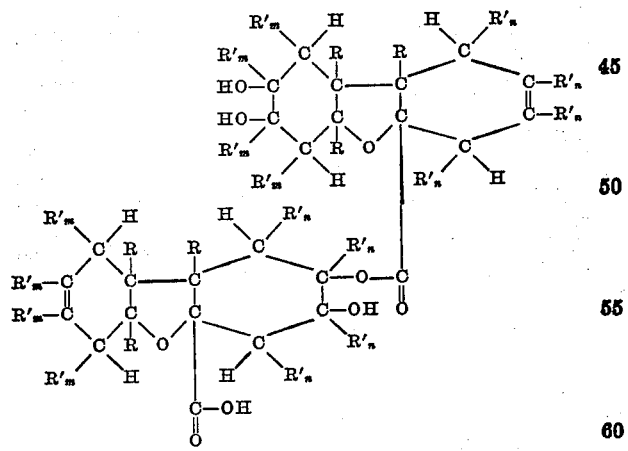

These esters or condensation products vary in molecular weight since a number of these hydroxylated acid molecules can be joined together through the ester linkages, thus forming a higher molecular weight polymer.

As was indicated hereinbefore, a feature of this invention is the production of resins, some of which are infusible, by heating the products of the hydroxylation reaction. When these products are heated, for example, to above about 60° C., preferably above about 95° C. for a period of about 3 minutes to 3 hours, resins having multiple molecules cross-linked, for example, as shown and discussed above, are formed. Resin formation can be accomplished by heating either in a closed or open container, in the presence or absence of air, or in the presence or absence of a suitable catalyst. Suitable catalysts include acid catalysts such as aryl- and alkyl-substituted aryl sulfonic acids and mineral acids, such as sulfuric and nitric acids. The time and temperature employed depends upon the type of product desired. The nature of these resins varies from fairly soft resins, capable of being drawn into threads, to hard, dark brown infusible resins, depending upon the conditions of treatment. These resins are useful for many purposes, such as plasticizers for butadiene-styrene rubbers, natural rubber and similar elastomeric materials, and can be employed as components of coating compositions. Also, these hydroxylated resins can be used as potting compounds since they form hard, infusible resins upon further heating in the presence or absence of catalysts.

Additional products of the hydroxylation reaction of our invention are minor amounts of a formate ester of the hydroxylated acid in the case where a formic acid or a lower alkyl formate catalyst is used. Such products are represented by the following formula:

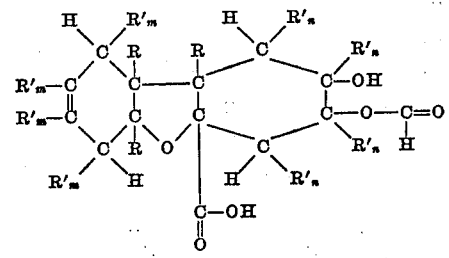

Additional products of the hydroxylation reaction of our invention are minor amounts of lactones which are represented by the following formula:

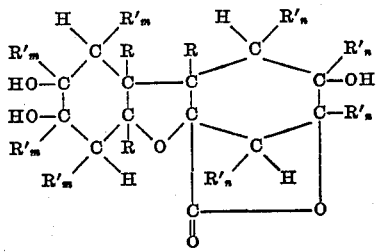

Examples of specific products of the process of this invention are as follows:

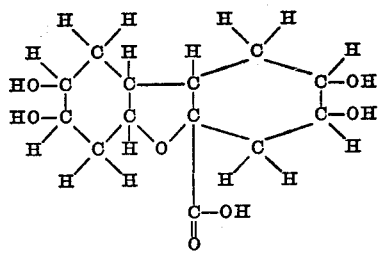

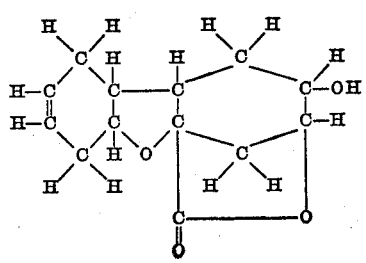

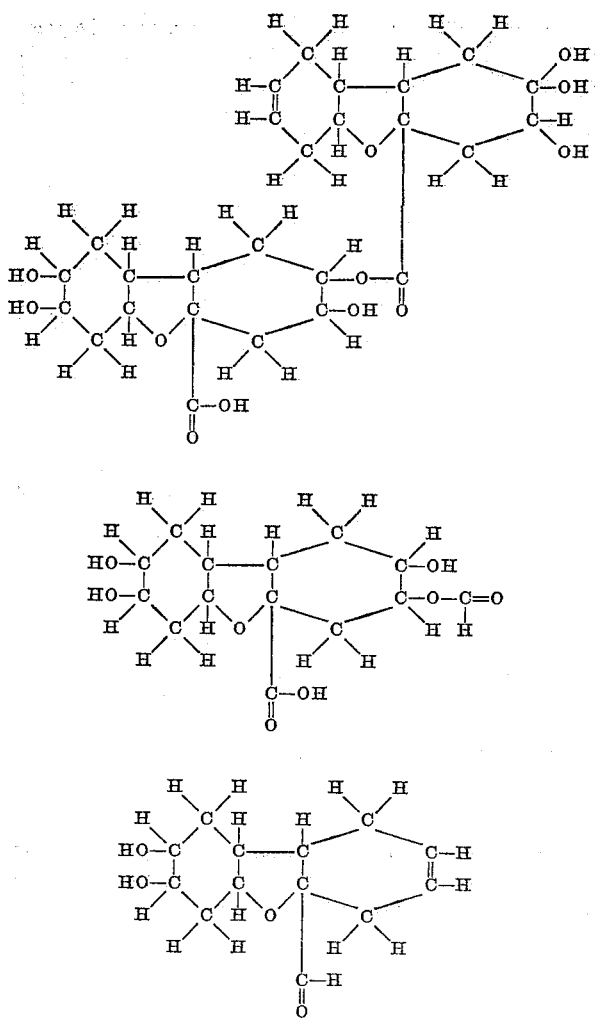

The alkyl derivatives of the above-described products are also obtainable, according to this invention, as indicated supra.

The following examples are illustrative of the preparation and types of compositions which are prepared according to this invention and should not be construed as unduly limiting the invention.

Example I

A sample of 2,3,4,5-bis($\Delta^2$-butenylene)tetrahydrofurfural (102 grams, 0.5 mole), obtained by the condensation of two moles of 1,3-butadiene with one mole of furfural, was charged to a reactor together with an aqueous solution of hydrogen peroxide, prepared by mixing 119 grams of 28.4 weight percent hydrogen peroxide (one mole), with 220 grams of water, and 56 grams of formic acid. The reactor was provided with a stirrer and a condenser. The temperature was maintained at 50° C. for 3.75 hours after which an additional 60 grams of 28.4 weight percent hydrogen peroxide was introduced. The reaction mixture was stirred an additional 18 hours at 50° C. and was then refluxed one hour to decompose any hydrogen peroxide and/or performic acid present. Water was then removed in vacuo (temperature of 50° C. and pressure approximately 4–5 mm. mercury). Approximately 200 cc. methanol was added to react with any formic acid present, the mixture was heated to 40° C., and the methanol together with any methyl formate which formed was removed in vacuo. The product which remained was a very viscous to semi-solid, dark brown material which was soluble in methanol but insoluble in water and carbon tetrachloride. Analysis for carbon and hydrogen gave the following results:

|  | Found | Calculated Double Bonds Hydroxylated | |
|---|---|---|---|
|  |  | 1 | 2 |
| Carbon, weight percent | 59.18 | 65.5 | 57 |
| Hydrogen, weight percent | 6.78 | 7.57 | 7.3 |

Example II

The hydroxylated product prepared as described in Example I was employed in two different quantities as a softener in a 74/26 butadieneacrylonitrile copolymer prepared by emulsion polymerization. The following compounding recipes were employed:

|  | Parts by Weight | |
|---|---|---|
|  | A | B |
| Butadiene-acrylonitrile copolymer | 100 | 100 |
| Philblack A[1] | 60 | 60 |
| Zinc Oxide | 5 | 5 |
| Stearic Acid | 1.5 | 1.5 |
| Sulfur | 1.5 | 1.5 |
| Altax[2] | 1.5 | 1.75 |
| Hydroxylated product from Example I | 10 | 20 |

[1] Medium abrasion furnace black.
[2] Benzothiazyl disulfide.

The samples were compounded and cured at 307° F. for 30 minutes and the physical properties were determined. A sample of butadieneacrylonitrile copolymer was compounded according to Recipe A except that the hydroxylated product from Example I was omitted. This sample was used as a control. Swelling tests were made on the cured samples by immersing them in a mixture containing 30 percent toluene and 70 percent isooctane at room temperature (80° F.) for seven days. The percentage of material extracted was determined by both weight and aliquot methods. In the weight method a sample is weighted prior to the swelling test, immersed in the extraction liquid for the requisite period, dried, and weighed again. In the aliquot method the quantity of extracted material is determined by evaporating the immersion liquid at the conclusion of the swelling test, drying the residue in an oven at 220° F. for 30 minutes, and weighing. Results of tests on physical properties were as follows:

|  | A | B | Control |
|---|---|---|---|
| Stress-strain properties at 80° F.: |  |  |  |
| Tensile, p.s.i | 3,010 | 3,000 | 3,450 |
| Elongation, percent | 295 | 285 | 315 |
| Shore hardness | 74 | 75 | 73 |
| Compression set, percent | 8.0 | 9.4 | 8.2 |
| Compound Ms–1½ at 212° F | 67 | 54.5 | 70 |
| Percent swelled [1] | 40.2 | 36.7 | 43.8 |
| Percent extracted [1]: |  |  |  |
| Weight | 1.1 | 1.6 | 2.3 |
| Aliquot | 1.4 | 1.4 | 1.2 |
| Freeze point, ° C., Gehman | −28 | −27 | −20 |

[1] 45 minutes' cure.

The compounded Mooney values show that the hydroxylated butadienefurfural condensation product has a softening effect on the butadieneacrylonitrile rubber. The samples containing this hydroxylated material have lower freeze points and swell less than the control. The data also show that the hydroxylated material is substantially non-extractable.

Example III

The process of Example I was repeated and a dark colored, solid material was obtained. This product had a neutralization equivalent of 368.

Example IV

A reactor was charged with 102 grams (0.5 mole) of 2,3,4,5-bis($\Delta^2$-butenylene)tetrahydrofurfural, an aqueous solution of hydrogen peroxide prepared by mixing 106 grams of 32 weight percent hydrogen peroxide (one mole) with 234 grams of water, and 60 grams of formic acid. The reactor was provided with a stirrer and a condenser. The temperature was increased to 50° C. and maintained at that level until 3.75 hours had elapsed from the beginning of the heating period. An additional 54 grams of 32 weight percent hydrogen peroxide was then added and the reaction continued for two hours and five minutes longer. The mixture was allowed to cool and let stand at room temperature for approximately 16 hours. At the end of this period substantially no hydrogen peroxide remained. Water and the major portion of formic acid were removed in vacuo (pressure 1-2 mm. Hg) at a temperature which did not exceed 30° C. Approximately 200 cc. methanol was added and the mixture was distilled at a pressure of 1-2 mm. Hg and a temperature which did not exceed 30° C. to remove unreacted methanol and any remaining formic acid as methyl formate. The product was a viscous, orange liquid which was soluble in methanol but insoluble in water and carbon tetrachloride. Carbon, hydrogen, and molecular weight determinations gave the following results:

Carbon, wt. percent _____ 64.8
Hydrogen, wt. percent _____ 7.1
Molecular weight _____ 290

Example V

Two samples of two grams each of the product obtained in Example IV were heated in closed containers in an oven at 100° C. for 24 hours. Prior to heating 0.1 gram xylenesulfonic acid was added to one of the samples. The viscosity increased and the color darkened in each case but the sample containing the xylenesulfonic acid became darker and more viscous than the other sample. Heating was continued for 48 hours at 160° C. The acid-containing sample was hard at room temperature while the other one was fairly soft but could be drawn out into threads approximately six inches in length.

Example VI

A sample of the product prepared in Example IV was heated in an open container at 400° F. (204.4° C.). After five minutes it changed to a dark brown, hard resin.

Example VII

A sample of the product prepared in Example IV was heated in an open container at 500° F. (260° C.) for 15 minutes. A hard, apparently infusible resin was obtained.

Example VIII

The method set forth in Example IV for preparing a hydroxylated product was repeated. A test for determining the carbonyl number of the product was carried out on a portion of the product. An aqueous solution of potassium hydroxide was added to the hydroxylated product until the resulting solution had a pH of 4. Hydroxylamine hydrochloride was then reacted with the solution and the resulting free HCl was titrated with potassium hydroxide again to a pH of 4. A carbonyl number of 48 was obtained thereby which indicates that a small amount of the hydroxylated product was still an aldehyde, i.e., that the aldehyde radical in a small amount of the product did not change during the hydroxylation reaction.

The remainder of the product of the hydroxylation reaction conducted in this example was further treated with 100 milliliters of 50 percent methyl alcohol-water solution, evaporated to dryness and dried at 100° C. under high vacuum. The product was a solid, brown, water-soluble powder. Analysis of this material gave the following results:

| | Found | Calculated for $C_{13}H_{22}O_6$ |
|---|---|---|
| Carbon, percent | 58.4 | 54.2 |
| Hydrogen, percent | 6.95 | 6.95 |
| Hydroxyl number | 73.3 | |
| Saponification number | 314.3 | |

Variations and modifications are possible within the scope of the foregoing specification and the appended claims to this invention, the essence of which is that a new reaction and new products are provided by hydroxylating 2,3,4,5-bis($\Delta^2$-butenylene)tetrahydrofurfural, and alkyl derivatives thereof, with hydrogen peroxide.

We claim:

1. A process which comprises reacting a compound selected from the group consisting of 2,3,4,5-bis($\Delta^2$-butenylene)tetrahydrofurfural and alkyl derivatives thereof with hydrogen peroxide in the liquid phase at a temperature in the range from 10 to 95° C. in the presence of a catalyst to form a hydroxylated product, and recovering said product.

2. A process which comprises reacting a compound selected from the group consisting of 2,3,4,5-bis($\Delta^2$-butenylene)tetrahydrofurfural and alkyl derivatives thereof with hydrogen peroxide at a temperature in the range from 10 to 95° C., at pressure sufficient to maintain liquid phase conditions and for a time in the range from 1 to 60 hours, and in the presence of a catalyst selected from the group consisting of formic acid and the lower alkyl esters thereof, and recovering a hydroxylated product.

3. A process which comprises reacting a compound selected from the group consisting of 2,3,4,5-bis($\Delta^2$-butenylene)tetrahydrofurfural and alkyl derivatives thereof with hydrogen peroxide in the presence of a catalyst selected from the group consisting of formic acid and the lower alkyl esters thereof, at a temperature in the range from 10 to 95° C., a molar ratio of hydrogen peroxide to said compound in the range from 0.2:1 to 4:1, a pressure sufficient to maintain the reactants and the catalyst substantially in the liquid phase and for a reaction time in the range from 1 to 60 hours, the molar ratio of catalyst to hydrogen peroxide being in the range from 0.2:1 to 2:1 and recovering a hydroxylated product.

4. The process of claim 3 in which said compound is 2,3,4,5-bis($\Delta^2$-butenylene)tetrahydrofurfural.

5. The process of claim 3 in which said compound has the formula:

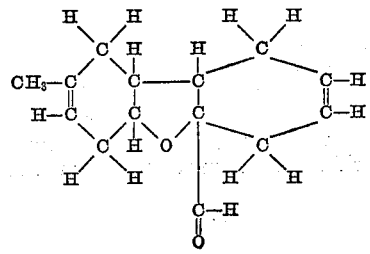

6. The process of claim 3 in which said compound has the formula:

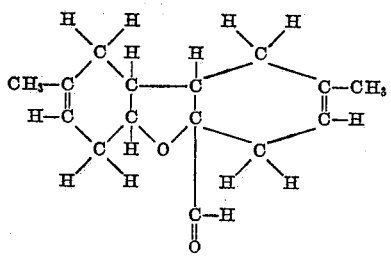

7. The process of claim 3 in which said compound has the formula:

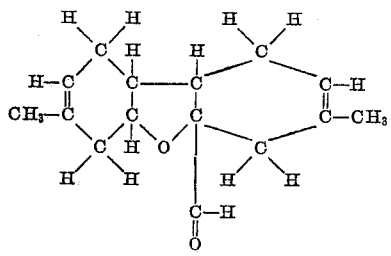

8. The process of claim 3 in which the temperature is in the range from 10 to 60° C., the reaction time is in the range from 2 to 30 hours, the catalyst is formic acid, and after said reaction time the reaction mixture is refluxed for a time in the range from 15 minutes to 5 hours, water is removed by heating in vacuo, the formic acid is esterified with methanol, methyl formate and methanol are removed by heating in vacuo, and a hydroxylated derivative is recovered from the residue.

9. The process of claim 3 in which the hydrogen peroxide is a 3 to 90 weight percent aqueous solution of hydrogen peroxide.

10. The process of claim 3 in which the molar ratio of hydrogen peroxide to said compound is in the range from 0.5:1 to 3:1 and the molar ratio of catalyst to hydrogen peroxide is 1:1.

11. A new composition of matter produced by the process of hydroxylating a compound having the formula

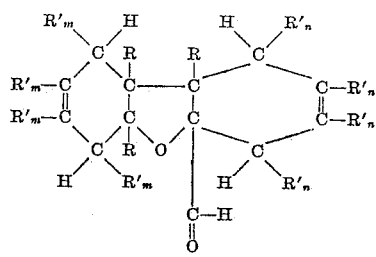

where R is selected from the group consisting of hydrogen and methyl and at least one R is hydrogen, each R' is selected from the group consisting of hydrogen and an alkyl radical having not more than three carbon atoms, the sum of the carbon atoms in the $R'_m$ radicals being less than four, the sum of the carbon atoms in the $R'_n$ radicals being less than four, and where at least two of the $R'_m$ and two of the $R'_n$ radicals are hydrogen, which process comprises reacting said compound with hydrogen peroxide at a temperature in the range from 10 to 95° C., at pressure sufficient to maintain liquid phase conditions and for a time in the range from 1 to 60 hours, and in the presence of a catalyst selected from the group consisting of formic acid and the lower alkyl esters thereof.

12. A resin formed by heating the product of the process of hydroxylating a compunud having the formula

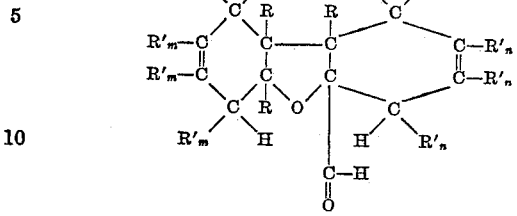

where R is selected from the group consisting of hydrogen and methyl and at least one R is hydrogen, each R' is selected from the group consisting of hydrogen and an alkyl radical having not more than three carbon atoms, the sum of the carbon atoms in the $R'_m$ radicals being less than four, the sum of the carbon atoms in the $R'_n$ radicals being less than four, and where at least two of the $R'_m$ and two of the $R'_n$ radicals are hydrogen which process comprises reacting said compound with hydrogen peroxide at a temperature in the range from 10 to 95° C., at pressure sufficient to maintain liquid phase conditions and for a time in the range from 1 to 60 hours, and in the presence of a catalyst selected from the group consisting of formic acid and the lower alkyl esters thereof, the first-mentioned heating step being carried out at a temperature in the range from above said hydroxylation reaction temperature to about 300° C.

13. A resin formed by heating in the presence of an acid catalyst selected from the group consisting of aryl- and alkyl-substituted sulfonic acids and mineral acids, the product of the process of hydroxylating a compound having the formula

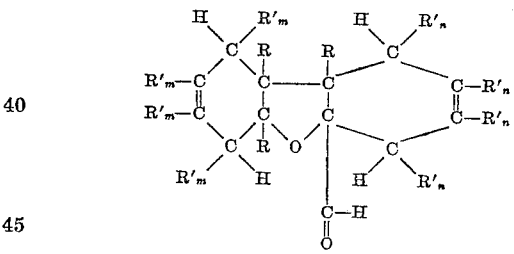

where R is selected from the group consisting of hydrogen and methyl and at least one R is hydrogen, each R' is selected from the group consisting of hydrogen and an alkyl radical having not more than three carbon atoms, the sum of the carbon atoms in the $R'_m$ radicals being less than four, the sum of the carbon atoms in the $R'_n$ radicals being less than four, and where at least two of the $R'_m$ and two of the $R'_n$ radicals are hydrogen, which process comprises reacting said compound with hydrogen peroxide at a temperature in the range from 10 to 95° C., at pressure sufficient to maintain liquid phase conditions and for a time in the range from 1 to 60 hours, and in the presence of a catalyst selected from the group consisting of formic acid and the lower alkyl esters thereof, the first-mentioned heating step being carried out at a temperature in the range from above said hydroxylation reaction temperature to about 300° C.

14. A resin in accordance with claim 13 wherein said catalyst is xylenesulfonic acid.

References Cited in the file of this patent
UNITED STATES PATENTS 2,766,216    Hillyer _____ Oct. 9, 1956

OTHER REFERENCES

Textbook of Organic Chemistry, by Wertheim, 3rd edition, page 156.

UNITED STATES PATENT OFFICE

CERTIFICATE OF CORRECTION

Patent No. 2,886,556                          May 12, 1959

John C. Hillyer et al.

It is hereby certified that error appears in the printed specification of the above numbered patent requiring correction and that the said Letters Patent should read as corrected below.

Column 1, line 64, for "therof" read -- thereof --; column 7, lines 3 to 7, first column, right-hand portion should appear as shown below instead of as in the patent -

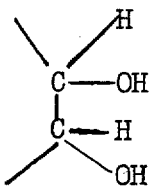

column 12, line 2, for ""componud" read -- compound --.

(SEAL)        Signed and sealed this 16th day of February 1960.
Attest:

KARL H. AXLINE

Attesting Officer

ROBERT C. WATSON
Commissioner of Patents